(12) United States Patent
Himuro

(10) Patent No.: US 6,213,180 B1
(45) Date of Patent: *Apr. 10, 2001

(54) PNEUMATIC RADIAL TIRE INCLUDING BEVELED ACUTE ANGLE CORNER PORTIONS

(75) Inventor: Yasuo Himuro, Tachikawa (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/041,022

(22) Filed: Mar. 12, 1998

(30) Foreign Application Priority Data

Mar. 26, 1997 (JP) .................................................... 9-073543

(51) Int. Cl.$^7$ ............................ B60C 11/03; B60C 115/00
(52) U.S. Cl. ................................. 152/209.15; 152/209.28
(58) Field of Search .......................... 152/209.28, 209.18, 152/209.15

(56) References Cited

U.S. PATENT DOCUMENTS

| | | | |
|---|---|---|---|
| 4,057,089 | * 11/1977 | Johannsen . | |
| 4,690,189 | * 9/1987 | Bradisse et al. | 152/209.15 |
| 4,832,099 | * 5/1989 | Matsumoto . | |
| 5,109,903 | * 5/1992 | Watanabe et al. | 152/209.15 |
| 5,234,042 | * 8/1993 | Kuhr et al. . | |
| 5,291,929 | * 3/1994 | Daisho et al. . | |
| 5,375,639 | * 12/1994 | Suzuki et al. . | |
| 5,421,391 | * 6/1995 | Himuro . | |
| 5,423,364 | * 6/1995 | Himuro . | |
| 5,707,461 | * 1/1998 | Himuro . | |
| 5,714,021 | * 2/1998 | Ochi . | |
| 5,746,849 | * 5/1998 | Hutson et al. . | |
| 5,885,384 | * 3/1999 | Himuro . | |

FOREIGN PATENT DOCUMENTS

| | | |
|---|---|---|
| 90 02 986 | 5/1991 | (DE) . |
| 0 064 934 A2 | 11/1982 | (EP) . |
| 0 233 135 A2 | 8/1987 | (EP) . |
| 627332 | * 12/1994 | (EP) . |
| 0 678 403 A1 | 10/1995 | (EP) . |
| 688685 | * 12/1995 | (EP) . |
| 0 705 718 A2 | 4/1996 | (EP) . |
| 705718 | * 4/1996 | (EP) . |
| 0 713 789 A1 | 5/1996 | (EP) . |
| 753418 | * 1/1997 | (EP) . |

(List continued on next page.)

OTHER PUBLICATIONS

Abstract for Japan 5–319025.*

Primary Examiner—Steve D. Maki
(74) Attorney, Agent, or Firm—Sughrue, Mion, Zinn, Macpeak & Seas, PLLC

(57) ABSTRACT

A pneumatic radial tire for passenger car has a directional tread pattern comprising many blocks formed in a tread portion by a plurality of circumferential grooves extending in a circumferential direction of the tire and a plurality of directional slant grooves obliquely extending with respect to the circumferential direction, wherein at least a part of the directional slant grooves is branched from the circumferential groove near to the pattern center and extends toward and is opened at an end of a ground contact region of the tread, and at least a part of corner portions of each of the blocks forms an acute angle of 10–60° defined by the circumferential groove and the directional slant groove; and a surface of the corner portion of the block having an acute angle of 10–60° is beveled over a distance of 10–30 mm from a tapered end thereof in a longitudinal direction so as to gradually shallow from the tapered end toward a width widened portion of the block in both stepping-in and kicking-out sides of the block.

6 Claims, 4 Drawing Sheets

FOREIGN PATENT DOCUMENTS

| | | |
|---|---|---|
| 0 812 709 A1 | 12/1997 | (EP) . |
| 1549347 * | 8/1979 | (GB) .............................. 152/209.15 |
| 63-312204 * | 12/1988 | (JP) .............................. 152/209.15 |
| 2-006204 | 1/1990 | (JP) . |
| 5-319025 | 12/1993 | (JP) . |
| 7-149114 * | 6/1995 | (JP) .............................. 152/209.15 |
| 9-2025 | 1/1997 | (JP) . |

* cited by examiner

PNEUMATIC RADIAL TIRE INCLUDING BEVELED ACUTE ANGLE CORNER PORTIONS

BACKGROUND OF THE INVENTION

1. Field of the Invention

This invention relates to a pneumatic radial tire, and more particularly to a pneumatic radial tire for passenger car having high running-performances and provided with a directional tread pattern specifying a rotating direction of the tire when mounted onto a vehicle. Many blocks are formed in the trend pattern at given intervals in a circumferential direction of the tire by a plurality of circumferential grooves arranged at given intervals in an axial direction of the tire and extending in parallel to or substantially in parallel to the circumferential direction. A plurality of directional slant grooves arranged in the trend pattern at given intervals in the circumferential direction and obliquely extending with respect to the circumferential direction.

The term "directional slant groove" used herein means a groove obliquely extending with respect to the circumferential direction and specifying a rotating direction (forward direction) of the tire to precedently contact a portion of the slant groove near to an equatorial plane of the tire with the ground and succeedingly contact a portion of the slant groove apart from the equatorial plane with ground when the tire is mounted onto a vehicle or forming so-called directional tread pattern.

2. Description of Related Art

In the high running-performance pneumatic radial tire for a passenger car, it is required to have excellent steering stability on a dry road surface and a low level of tire noise while highly maintaining a drainage property on a wet road surface. However, these performances required in the tire conflict with each other in the pattern design, so that it is very difficult to provide a tire simultaneously establishing excellent drainage property in the running on wet road surface, steering stability in the running on dry road surface and low tire noise level according to the conventional technique.

In order to enhance the drainage property in the running on wet road surface, for instance, there is proposed and practiced a tread pattern wherein many blocks are formed at intervals in an axial direction and a circumferential direction of the tire by a plurality of circumferential grooves straight-forward extending in the circumferential direction and a plurality of slant grooves obliquely extending with respect to the circumferential direction. In order to more improve the drainage property in the running on wet road surface, it is favorable to render the slant groove into a steeply slant groove extending at a small inclination angle with respect to the circumferential direction. On the other hand, in order to enhance the steering stability in the running on dry road surface, it is favorable to render the slant groove into a gently slant groove extending at a large inclination angle with respect to the circumferential direction. Particularly, when the inclination angle of the slant groove is made large with respect to the circumferential direction, there is caused a problem of deteriorating the tire noise level.

SUMMARY OF THE INVENTION

It is, therefore, an object of the invention to solve the aforementioned problems of the conventional technique and to provide a high running-performance pneumatic radial tire for a passenger car having an excellent steering stability on a dry road surface and a low level of tire noise while highly maintaining a drainage property on wet road surface.

According to the invention, there is the provision of in a pneumatic radial tire for passenger car comprising many blocks formed at intervals in circumferential and axial directions of the tire by a plurality of circumferential grooves arranged at intervals in the axial direction and extending in parallel to or substantially in parallel to the circumferential direction and a plurality of directional slant grooves arranged at intervals in the circumferential direction and obliquely extending with respect to the circumferential direction, and provided with a directional tread pattern specifying a rotating direction of the tire when being mounted onto a vehicle to precedently contact a portion of the directional slant groove near to an equatorial plane of the tire with ground and succeedingly contact a portion of the directional slant groove apart from the equatorial plane with ground, the improvement wherein:

(1) at least a part of said directional slant grooves branches from a circumferential groove arranged in the vicinity of a center of the tread pattern among said circumferential grooves and extends toward and is opened at an end of a ground contact region of the tread;

(2) at least a part of corner portions of each of said blocks forms an acute angle of 10–60° defined by said circumferential groove and said directional slant groove; and (3) a surface of said corner portion of the block having an acute angle of 10–60° is beveled over a distance of 10–30 mm from a tapered end thereof in a longitudinal direction so as to gradually shallow from the tapered end toward a width widened portion of the block in both stepping-in and kicking-out sides of the block.

In a preferable embodiment of the invention, the angle of the corner portion located toward the center of the tread pattern in the block defined by the circumferential groove and the directional slant groove is smaller than the angle of the corner portion located toward the tread end.

In another preferable embodiment of the invention, a side facing the equatorial plane in two sides of the corner portion of the block formed in the vicinity of the center of the tread pattern extends at an angle of 0–20° with respect to the circumferential direction of the tire.

In the other preferable embodiment of the invention, a width of the directional slant groove adjacent to the corner portion having an acute angle of 10–60° at a stepping-in side of the block is narrower than a width of the directional slant groove adjacent to the corner portion having an acute angle of 10–60° at a kicking-out side of the block.

BRIEF DESCRIPTION OF THE DRAWINGS

The invention will be described with reference to the accompanying drawings, wherein.

DESCRIPTION OF PREFERRED EMBODIMENTS

Figure 1:
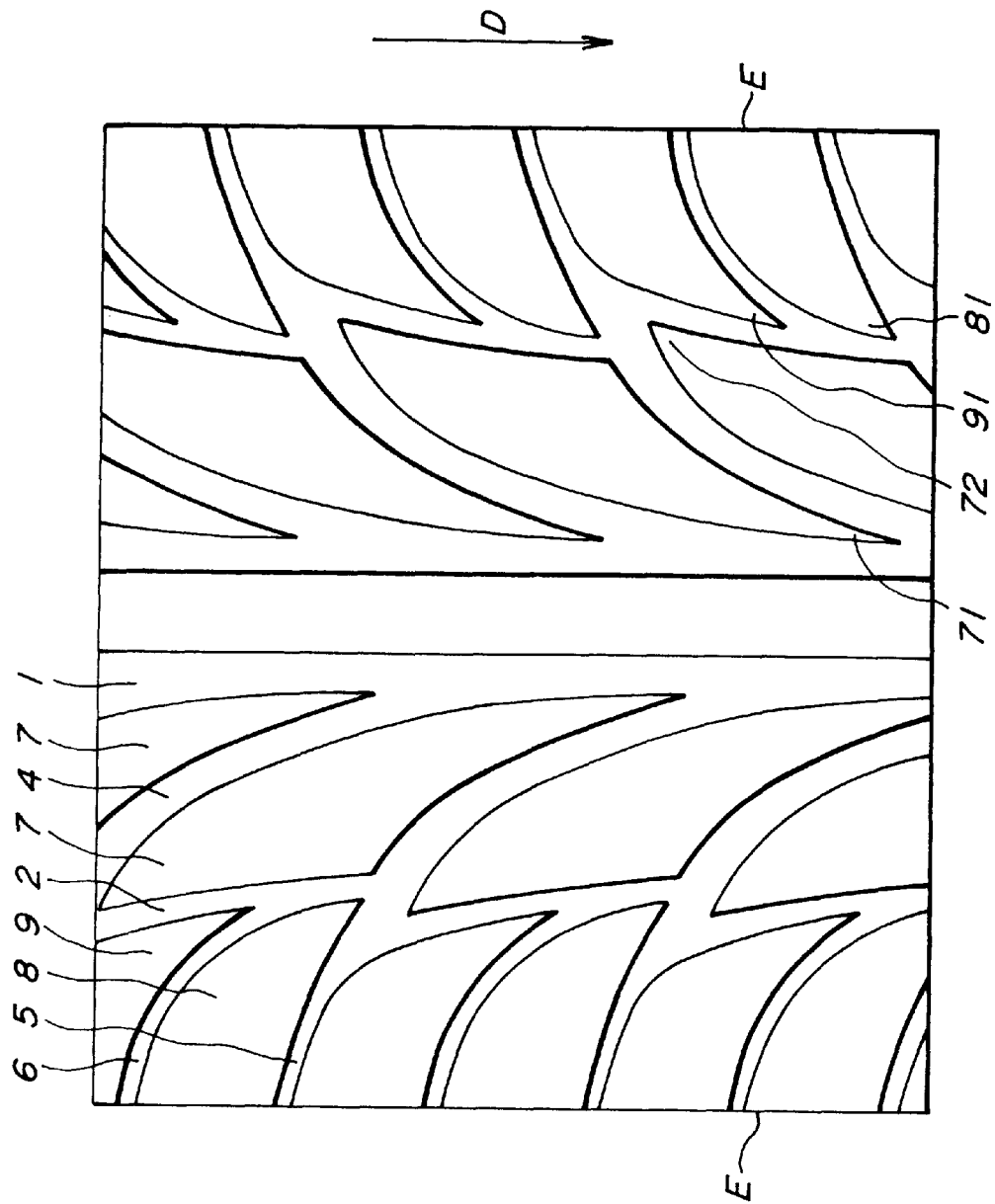
FIG. 1 is a partially enlarged front view of an embodiment of the tread pattern in the pneumatic tire according to the invention.

In the pneumatic radial tire according to the invention, the tread pattern has the aforementioned structure wherein many blocks are formed at intervals in circumferential and axial directions of the tire by plural circumferential grooves and plural directional slant grooves. At least a part of the directional slant grooves is branched from a circumferential groove arranged in the vicinity of a center of the tread pattern among said circumferential grooves and extends toward and is opened at an end of a ground contact region of the tread. At least a part of corner portions of each of the blocks forms an acute angle of 10–60° defined by the circumferential groove and the directional slant groove, and a surface of the corner portion of the block having an acute angle of 10–60° is beveled over a distance of 10–30 mm from a tapered end thereof in a longitudinal direction to gradually shallow from the tapered end toward a width widened portion of the block in both stepping-in and kicking-out sides of the block. As a result the branching and joining of water flow are smoothly conducted without forming bubbles in the water flow or the drainage action effectively utilizing a groove volume from the pattern center toward the ground contact end is developed smoothly and hence there are provided high running-performance pneumatic radial tires having excellent drainage property in the running on wet road surface.

When the angle of the corner portion of the block defined by the circumferential groove and the directional slant groove exceeds 60°, the smooth water flow is not obtained and the drainage property when running on a wet road surface becomes poor. When it is less than 10°, block rigidity is lacking and the steering stability in the running on dry road surface becomes poor.

In order to simultaneously establish the drainage property running on a wet road surface and have a low level of tire noise, it is favorable that the slant groove particularly located in a central zone of the tread is rendered into a steeply slant groove extending at a small inclination angle with respect to the circumferential direction. In order to ensure the block rigidity for enhancing the steering stability in the running on dry road surface, it is favorable to set a pitch of the block to a large value, whereby a circumferential length of the block ranging from a stepping-in side end to a kicking-out side end is necessarily made large. As the length of the block in the circumferential direction becomes long, the rigidity in the circumferential direction becomes large and hence the block stretches at the stepping-in side and kicking-out side portions during the running of the tire and ground contact pressure becomes higher to strengthen impact component, which tends to deteriorate the reduction of tire noise. This tendency become conspicuous when the length of the block is not less than ⅓ of a ground contact length of the tread.

In the pneumatic radial tire according to the invention, at least a part of corner portions of each of the blocks forms an acute angle of 10–60° defined by the circumferential groove and the directional slant groove, and a surface of the corner portion of the block having an acute angle of 10–60° is beveled over a distance of 10–30 mm from a tapered end thereof in a longitudinal direction to gradually shallow from the tapered end toward a width widened portion of the block in both stepping-in and kicking-out sides of the block, so that the tendency of strengthening the impact component to deteriorate the reduction of tire noise can be controlled or prevented. There are provided low-noise pneumatic radial tires having excellent drainage property in the running on wet road surface and steering stability in the running on dry road surface.

The kicking-out side end of the corner portion of the block corresponds to a joining point between the circumferential groove and the directional slant groove, so that it is favorable that the surface of the corner portion of the block is beveled so as to gradually shallow from the tapered end toward a width widened portion of the block as previously mentioned in order to obtain the smooth water flow.

According to the invention, it is favorable that a side facing to the equatorial plane in two sides of the corner portion of the block formed in the vicinity of the center of the tread pattern extends at an angle of 0–20° with respect to the circumferential direction of the tire in order to provide a pneumatic radial tire having an excellent performance of reducing tire noise.

When the angle exceeds 20°, the impact component at the stepping-in side end of the corner portion of the block considerably increases and also the width of the directional slant groove is made wider in view of the drainage property this tends to deteriorate the reduction of tire noise due to the increase of the impact component and air volume.

According to the invention, a width of the directional slant groove adjacent to the corner portion having an acute angle of 10–60° at a stepping-in side of the block is narrower than a width of the directional slant groove adjacent to the corner portion having an acute angle of 10–60° at a kicking-out side of the block, whereby the impact component is lowered to provide a pneumatic radial tire having a low level of tire noise.

Figure 2:
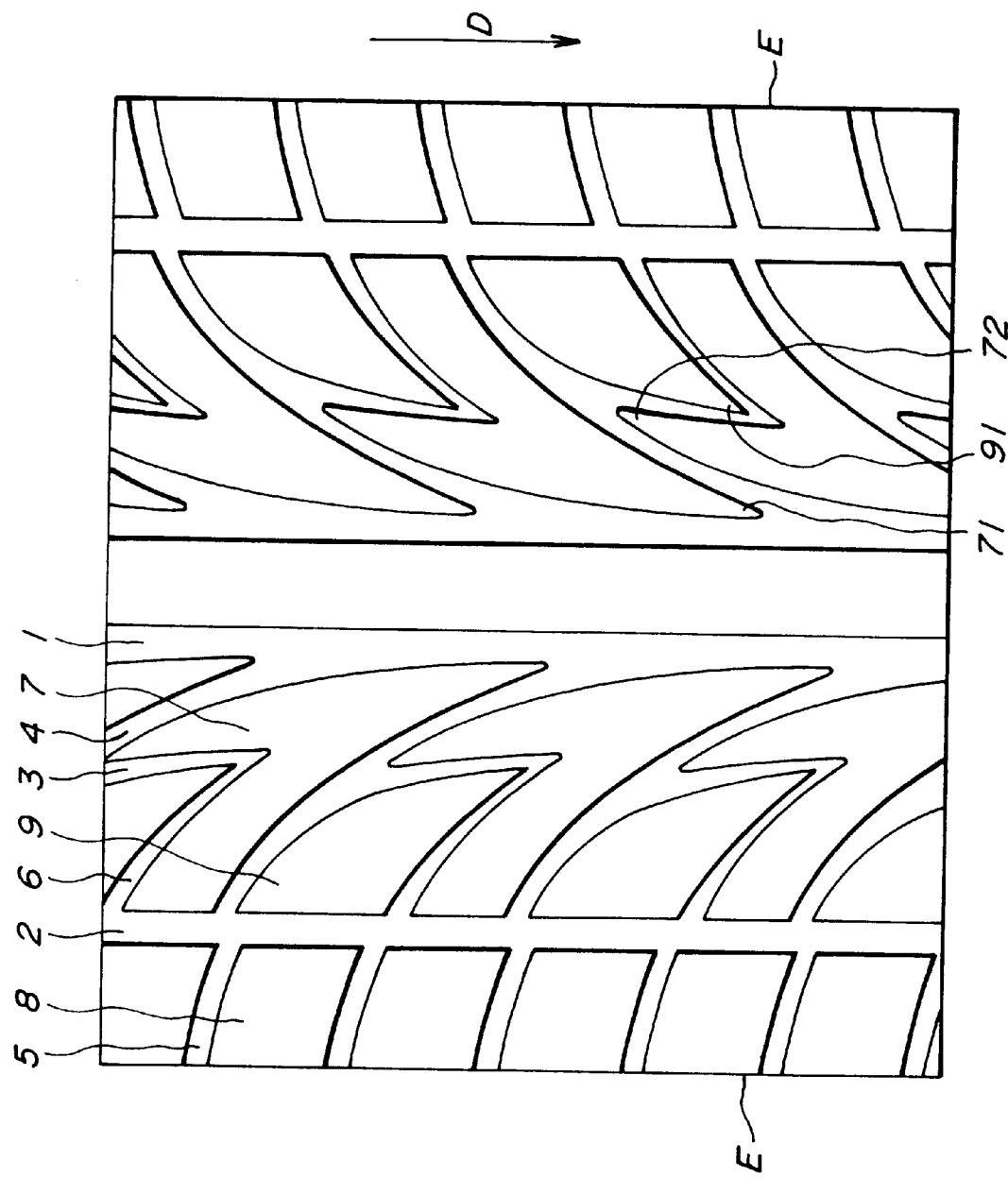
FIG. 2 is a partially enlarged front view of another embodiment of the tread pattern in the pneumatic tire according to the invention.
Figure 3:
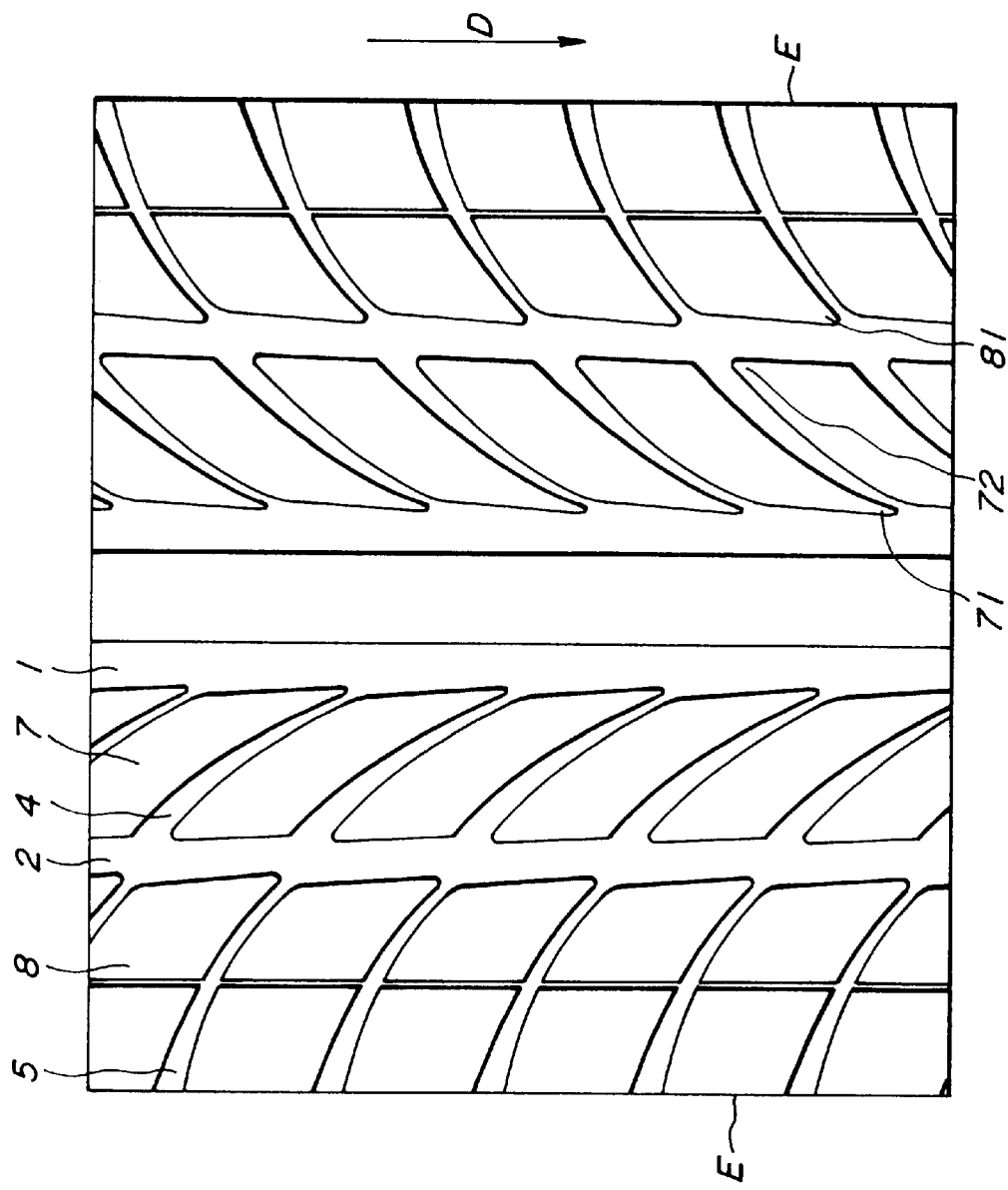
FIG. 3 is a partially enlarged front view of the other embodiment of the tread pattern in the pneumatic tire according to the invention.

FIGS. 1–3 show various embodiments of the tread pattern in the pneumatic radial tire according to the invention, respectively. In this case, the tire has a tire size of 225/50R16 and a tread width of 200 mm.

The tire of Example 1 shown in FIG. 1 comprises many blocks 7, 8, 9 formed at intervals in circumferential and axial directions of the tire by a plurality of circumferential grooves 1, 2 arranged at intervals in the axial direction and extending in parallel to or substantially in parallel to the circumferential direction. A plurality of directional slant grooves 4, 5, 6 are arranged at intervals in the circumferential direction and obliquely extending with respect to the circumferential direction. The tire has a directional tread pattern specifying a rotating direction D of the tire when being mounted onto a vehicle to precedently contact a portion of the directional slant groove (4, 5, 6) near to an equatorial plane of the tire with ground and succeedingly contact a portion of the directional slant groove (4, 5, 6) apart from the equatorial plane with ground.

The slant groove 4 is branched from the circumferential groove 1 arranged in the vicinity of a center of the tread pattern and extends toward an end of a tread so as to connect to the slant groove 5 and is opened at an end E of a ground contact region of the tread.

At least corner portions 71, 72, 81, 91 among corner portions of the blocks 7, 8, 9 form acute angles of 15°, 50°, 45° and 25° defined by the circumferential grooves 1, 2 and the directional slant grooves 4, 5, 6, respectively.

The surfaces of these corner portions 71, 72, 81, 91 having the above acute angles are beveled over distances of 30 mm, 15 mm, 10 mm and 20 mm from their tapered ends in a longitudinal direction to gradually shallow from the tapered end toward a width widened portion of the block, respectively.

The angle of the corner portion 71 of the block 7 defined by the circumferential grooves 1, 2 and the directional slant grooves 4 is relatively small as compared with the angle of the corner portion 72 of the block 7.

A side facing to the equatorial plane in two sides of the corner portion 71 of the block 7 formed in the vicinity of the center of the tread pattern extends at an angle of 3° with respect to the circumferential direction of the tire.

A width of the directional slant groove 4 adjacent to the corner portion 71 at a stepping-in side among the corner portions 71, 72 of the block 7 defined by the circumferential grooves 1, 2 and the directional slant grooves 4 is narrower than a width of the directional slant groove 4 adjacent to the corner portion 72 at a kicking-out side of the block 7.

The circumferential groove 2 connects to two directional slant grooves 5 adjacent thereto and extends in the same direction as in the extending direction of the directional slant groove 5 or in a direction of contacting with ground from a position located near to the pattern center to a position near to the tread end in turn in use at a relatively small inclination angle with respect to the circumferential direction of the tire, preferably an angle of 3–15°.

The arrangement of the circumferential groove 2 facilitates the wiping of the tread or the deformation in the pushing of arc portion onto flat face to improve the ground contacting property of the tread.

Moreover, when the circumferential groove 2 is arranged in a position located inward from the ground contact end to about 25% of the tread width, it is apt to damage the block because buckling is easy to be caused at this position, so that it is necessary to avoid the arrangement of the circumferential groove 2 at such a position.

Since the circumferential groove 2 extends in the same direction as in the directional slant groove 5 and at a relatively small inclination angle with respect to the circumferential direction, each of the blocks 8, 9 located at the shoulder side forms substantially a parallelogram, in which an angle of a corner portion at a kicking-out side is large, to provide a sufficient block rigidity against lateral force, which advantageously acts to the steering stability. Further, the circumferential groove 2 successively comes into the ground contact zone toward the side of the tread, so that it advantageously acts to the drainage property.

The directional slant groove 6 is located between two adjacent directional slant grooves 5 and extends from the circumferential groove 2 substantially in parallel to these directional slant grooves 5, preferably at an angle of 65–85° with respect to the circumferential direction of the tire to open at the ground contact end.

In the blocks formed by the arrangement of directional slant grooves 4 and 5, blocks located at the shoulder side tend to have a large ground contact area as compared with blocks located at side of pattern center and hence the heel and toe wear tends to be caused by the movement of the shoulder side blocks through lateral force or the pulling based on the difference of tire diameter. In the invention, the shoulder side block is divided into two blocks 8, 9 by arranging the directional slant groove 6, whereby the occurrence of the heel and toe wear can be controlled while enhancing the drainage property.

The tire of Example 2 shown in FIG. 2 comprises many blocks 7, 8, 9 formed at intervals in circumferential and axial directions of the tire by a plurality of circumferential grooves 1, 2, 3 arranged at intervals in the axial direction and extending in parallel to or substantially in parallel to the circumferential direction. A plurality of directional slant grooves 4, 5, 6 are arranged at intervals in the circumferential direction and obliquely extending with respect to the circumferential direction. This defines a directional tread pattern specifying a rotating direction D of the tire when being mounted onto a vehicle to precedently contact a portion of the directional slant groove (4, 5, 6) near to an equatorial plane of the tire with ground and succeedingly contact a portion of the directional slant groove (4, 5, 6) apart from the equatorial plane with ground.

The slant groove 4 is branched from the circumferential groove 1 arranged in the vicinity of a center of the tread pattern and extends toward an end of a tread so as to connect to the slant groove 5 and is opened at an end E of a ground contact region of the tread.

At least corner portions 71, 72, 91 among corner portions of the blocks 7, 9 form acute angles of 20°, 25° and 30° defined by the circumferential grooves 1, 3 and the directional slant grooves 4, 6, respectively.

The surfaces of these corner portions 71, 72, 91 having the above acute angles are beveled over distances of 25 mm, 20 mm and 15 mm from their tapered ends in a longitudinal direction to gradually shallow from the tapered end toward a width widened portion of the block, respectively.

The angle of the corner portion 71 of the block 7 defined by the circumferential grooves 1, 2, 3 and the directional slant grooves 4, 6 is relatively small as compared with the angle of the corner portion 72 of the block 7.

A side facing to the equatorial plane in two sides of the corner portion 71 of the block 7 formed in the vicinity of the center of the tread pattern extends at an angle of 3° with respect to the circumferential direction of the tire.

A width of the directional slant groove 4 adjacent to the corner portion 71 at a stepping-in side among the corner portions 71, 72 of the block 7 defined by the circumferential grooves 1, 2, 3 and the directional slant grooves 4, 6 is narrower than a width of the directional slant groove 4 adjacent to the corner portion 72 at a kicking-out side of the block 7.

The tire of Example 3 shown in FIG. 3 comprises many blocks 7, 8 formed at intervals in circumferential and axial directions of the tire by a plurality of circumferential grooves 1, 2 arranged at intervals in the axial direction and extending in parallel to or substantially in parallel to the circumferential direction. A plurality of directional slant grooves 4, 5 arranged at intervals in the circumferential direction and obliquely extending with respect to the circumferential direction. This defines a directional tread pattern specifying a rotating direction D of the tire when being mounted onto a vehicle so as to precedently contact a portion of the directional slant groove (4, 5) near an equatorial plane of the tire with ground and succeedingly contact a portion of the directional slant groove (4, 5) apart from the equatorial plane with ground.

The slant groove 4 branches from the circumferential groove 1 arranged in the vicinity of a center of the tread pattern and extends toward an end of a tread to connect to the slant groove 5 and is opened at an end E of a ground contact region of the tread.

At least corner portions 71, 72, 81 among corner portions of the blocks 7, 8 form acute angles of 25°, 45° and 45° defined by the circumferential grooves 1, 2 and the directional slant grooves 4, 5, respectively.

The surfaces of these corner portions 71, 72, 81 having the above acute angles are beveled over distances of 20 mm, 10 mm and 10 mm from their tapered ends in a longitudinal direction to gradually shallow from the tapered end toward a width widened portion of the block, respectively.

The angle of the corner portion 71 of the block 7 defined by the circumferential grooves 1, 2 and the directional slant grooves 4 is relatively small as compared with the angle of the corner portion 72 of the block 7.

A side facing the equatorial plane in two sides of the corner portion 71 of the block 7 formed in the vicinity of the center of the tread pattern extends at an angle of 5° with respect to the circumferential direction of the tire.

A width of the directional slant groove 4 adjacent to the corner portion 71 at a stepping-in side among the corner portions 71, 72 of the block 7 defined by the circumferential grooves 1, 2 and the directional slant grooves 4 is narrower than a width of the directional slant groove 4 adjacent to the corner portion 72 at a kicking-out side of the block 7.

Figure 4:
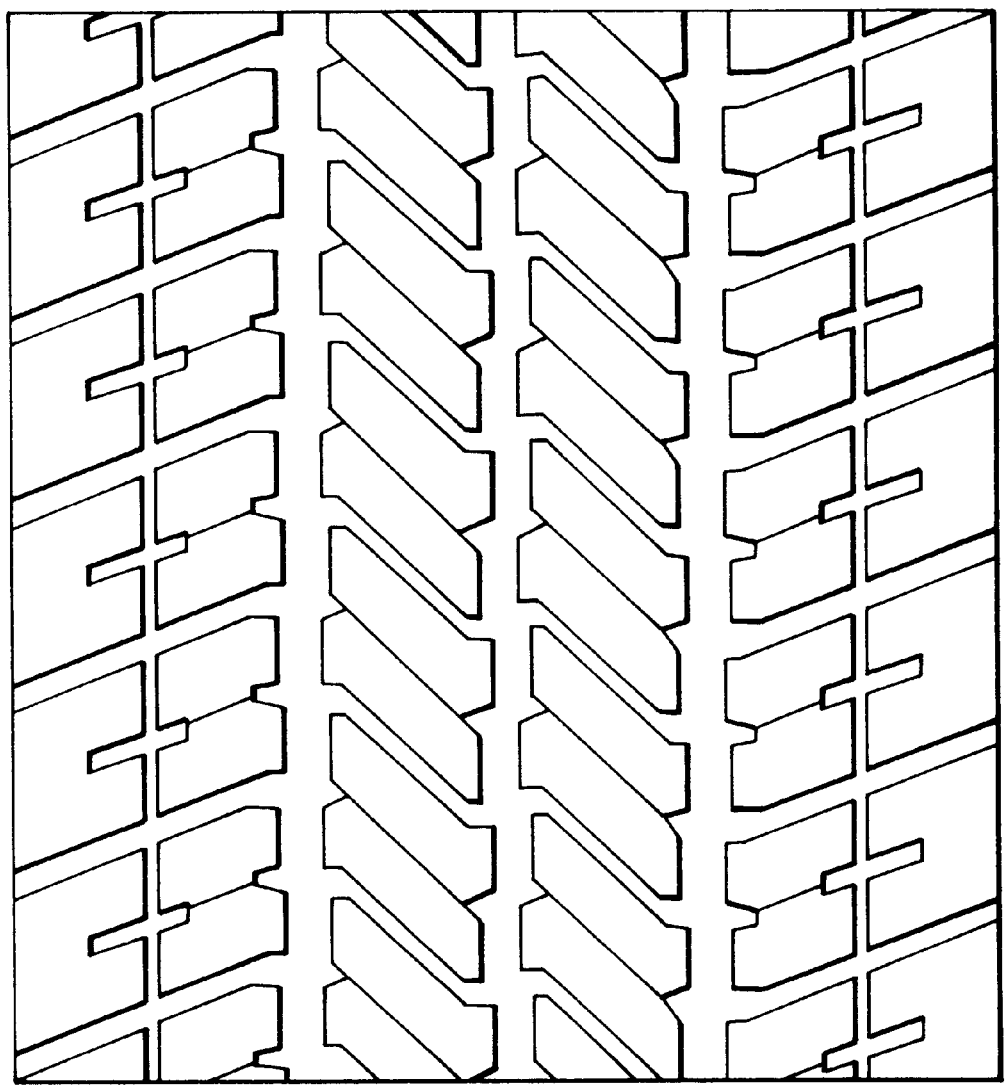
FIG. 4 is a partially enlarged front view of an embodiment of the tread pattern in the conventional pneumatic tire.

FIG. 4 shows an embodiment of the tread pattern in the conventional tire.

This conventional tire has a tread pattern having many blocks formed at intervals in the circumferential and axial directions of the tire by five circumferential grooves straightforward extending in the circumferential direction and a plurality of slant grooves extending at an inclination angle of about 45° with respect to the circumferential direction.

With respect to the tires of Examples 1–3 and the conventional tire, the drainage property in the running on wet road surface, steering stability in the running on dry road surface and performance of reducing tire noise are evaluated by the following tests to obtain results as shown in Table 1.

The drainage property in the running on wet road surface is evaluated by a driver's feeling on a limit speed of hydroplaning occurrence when the tire is run on wet road surface having a water depth of 5 mm, and the steering stability in the running on dry road surface is evaluated by a driver's feeling when the tire is sportily run on a circuit course at a dry state under various running modes. The performance of reducing tire noise is evaluated by a driver's feeling on indoor sound when the tire is inertially run on a straight smooth road from a speed of 100 km/h.

In Table 1, each of the properties is represented by an index on the basis that the conventional tire is 100, in which the larger the index value, the better the property.

TABLE 1

| Tire | Conventional tire | Example 1 | Example 2 | Example 3 |
|---|---|---|---|---|
| Drainage property | 100 | 130 | 125 | 110 |
| Steering stability | 100 | 110 | 105 | 100 |
| Tire noise | 100 | 100 | 105 | 120 |

As seen from the result of Table 1, the invention provides pneumatic radial tires having an excellent drainage property in the running on wet road surface without lowering the steering stability in the running on dry road surface and the performance of reducing tire noise.

What is claimed is:

1. A pneumatic radial tire for passenger car use comprising; a tread including many blocks formed at intervals in circumferential and axial directions of the tire by a plurality of circumferential grooves arranged at intervals in the axial direction and extending in parallel to or substantially in parallel to the circumferential direction and a plurality of directional slant grooves arranged at intervals in the circumferential direction and obliquely extending with respect to the circumferential direction, said plurality of circumferential grooves including outer circumferential grooves, each outer circumferential groove connecting two directional slant grooves and extending in a direction of ground contact from a position located near a center of a tread pattern to a position near a tread end at a relatively small inclination angle with respect to the circumferential direction of the tire, and the tread being provided with a directional tread pattern specifying a rotating direction of the tire when mounted onto a vehicle to precedently contact a portion of the directional slant groove close to an equatorial plane of the tire with ground and succeedingly contact a portion of the direction slant groove apart from the equatorial plane with ground, wherein, (1) at least a part of said directional slant grooves is branched from a circumferential groove arranged in the vicinity of a center of the tread pattern among said circumferential grooves and extends toward and is opened at an end of a ground contact region of the tread;

(2) each of at least two corner portions of each of said blocks forms an acute angle of 10–60° defined by one of said circumferential grooves and one of said directional slant grooves; and (3) a surface of each of said two corner portions of the block having an acute angle 10–60° is beveled over a distance of 10–30 mm from a tapered end thereof in a longitudinal direction so as to gradually shallow from the tapered end toward a width widened portion of the block in both stepping-in and kicking-out sides of the block.

2. A pneumatic radial tire according to claim 1, wherein the angle of the corner portion located toward the center of the tread pattern in the block defined by the circumferential groove and the directional slant groove is smaller than the angle of a corner portion located toward the tread end.

3. A pneumatic radial tire according to claim 1, wherein a side facing to the equatorial plane in two sides of the corner portion of the block formed in the vicinity of the center of the tread pattern extends at an angle of 0–20° with respect to the circumferential direction of the tire.

4. A pneumatic radial tire according to claim 1, wherein a width of the directional slant groove adjacent to the corner portion having an acute angle of 10–60° at a stepping-in side of the block is narrower than a width of the directional slant groove adjacent to the corner portion having an acute angle of 10–60° at a kicking-out side of the block.

5. A pneumatic radial tire according to claim 1 wherein said tread has a circumferential rib at a tire equator.

6. A pneumatic tire according to claim 1, wherein each of said circumferential grooves is inclined at an angle in the range of 3 to 15° with respect to the circumferential direction.

* * * * *